TEMPERATURE COMPENSATED SILICON CONTROLLED RECTIFIER

Filed Jan. 17, 1964

INVENTOR.
HAROLD WEINSTEIN

BY

OSTROLENK, FABER, GERB & SOFFEN

ATTORNEYS

United States Patent Office 3,274,400
Patented Sept. 20, 1966

3,274,400

TEMPERATURE COMPENSATED SILICON CONTROLLED RECTIFIER

Harold Weinstein, Van Nuys, Calif., assignor to International Rectifier Corporation, El Segundo, Calif., a corporation of California Filed Jan. 17, 1964, Ser. No. 338,473
1 Claim. (Cl. 307—88.5)

This invention relates to four-layer semiconductor devices, and more specificially relates to a four-layer semiconductor device which has increased forward blocking voltages and decreased temperature sensitivity as compared to four-layer devices presently in use.

It is well known that four-layer semiconductor devices such as controlled rectifiers are temperature sensitive. The principle of the present invention is to create an auxiliary field within the four-layer device which will affect the drift of minority carriers within the device in such a manner that its temperature characteristics can be stabilized and its forward blocking voltage increased. More specificially, and in accordance with the invention, a portion of one of the intermediate layers of the four-layer device is exposed and receives a dielectric surface portion. An electrode is then plated upon this dielectric surface portion, whereby an electric field can be introduced into the device which is related to temperature and serves to alter the characteristics of the device as a function of temperature in order to maintain the characteristics of the device independent of temperature.

Alternatively, a magnetic field could be injected into the device which similarly varies with temperature so that the drift of electrons and/or holes are suitably controlled so that the overall characteristics of the device are independent of temperature.

Accordingly, a primary object of this invention is to modulate the temperature characteristics of a four-layer device.

Another object of this invention is to increase electron-hole recombination with a four-layer device.

A still further object of this invention is to introduce an electric field into a four-layer device in such a manner as to cause the alpha of one of the equivalent transistor portions of the four-layer device to vary inversely proportional to temperature.

Figure 1:
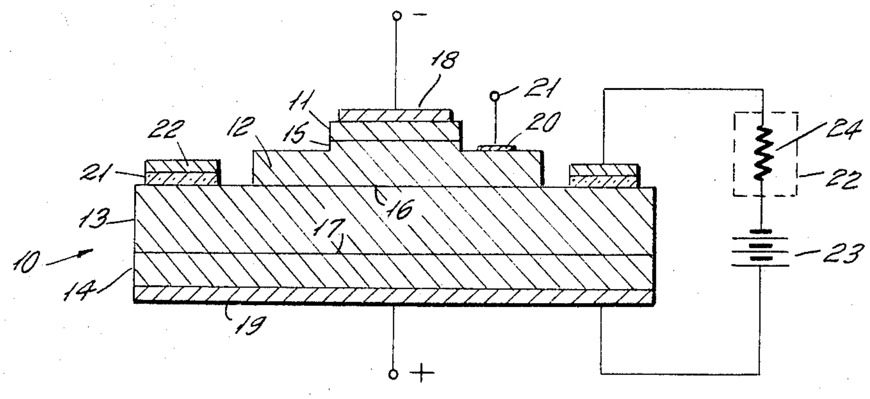

These and other objects of this invention will become apparent from the following description when taken in connection with the accompanying drawings, in which:

FIGURE 1 schematically illustrates a cross-sectional view of a four-layer device constructed in accordance with the invention along with control circuitry therefor.

Figure 2:
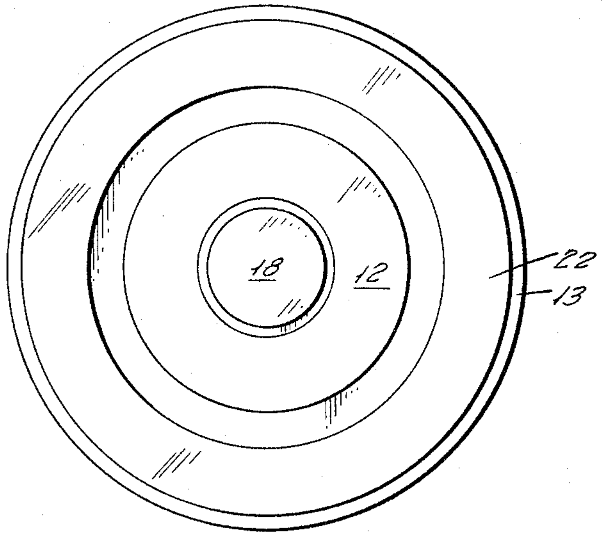

FIGURE 2 is a top view of FIGURE 1.

Referring now to the figures, I have illustrated therein a typical four-layer semiconductor device in the form of a controlled rectifier. This device includes a preferably monocrystalline disk 10 of silicon which could, for example, have a thickness of 10 mils and a diameter, for example, of 500 mils. The wafer 10 is suitably prepared to have four layers of the alternate conductivity types such as the layers 11, 12, 13 and 14 which are of N, P, N and P characteristics respectively. These layers, of course, define the junctions 15, 16 and 17 in the usual manner.

The main power carrying electrodes of the device are then suitably plated on the top and bottom layers as the conductive electrode layers 18 and 19 respectively. A portion of layer 12 is then exposed and receives the gate electrode 20 which is connected to a suitable gate terminal 21.

In accordance with the invention, the upper surface of layer 13 is also exposed as an annular ring which receives by any suitable disposition technique a dielectric film 21. A conductive coating 22 is then placed on the film 21 and is connected to an external circuit which includes any suitable temperature compensating circuit 22, shown in dotted lines, and a suitable source of biasing voltage 23.

By way of example, the temperature compensating circuit 22 could include a suitable thermistor 24 whereby the current drawn from source 23 will be functionally related to the ambient temperature.

To understand the operation of the novel device of FIGURES 1 and 2, the layer 13 may be considered as part of the first transistor portion of the controlled rectifier which includes layers 12, 13 and 14. Layer 13 is so constructed that it does not have an impurity gradient which would cause a drift field. Moreover, layer 13 will have a relatively large thickness as compared to the remaining layers.

More specificially, the thickness of layers 13 will be such that it is equal to or slightly less than the diffusion length of holes injected from layer 14. The layer 12 will have a thickness such that the output voltage of the circuit including source 23 and compensating circuit 22 will be able to affect the path of holes injected from layer 14 which diffuse toward layers 13 and 12. These holes will be deflected toward the dielectric interface between layer 13 and dielectric layer 21 when the compensating voltage source biases layer 11 sufficiently negative. Thus, this interface will act as a high recombination region. This, in turn, will effectively lower the alpha of the transistor portion including layers 12, 13 and 14 of the controlled rectifier.

By temperature compensating this circuit, for example, by the thermistor 24, it is now clear that the alpha of the equivalent transistor portion referred to above will change inversely proportional with temperature, whereby the device will block higher forward voltage than could normally be the case. Therefore, the novel device of the invention will operate to constantly modulate the temperature characteristics of the device so that it will have a relatively stable temperature characteristic. Moreover, recombination will be increased rather than lowered with the novel arrangement.

While the foregoing describes layer 13 as having a substantially zero drift field, it will be understood that layer 12 can also have a substantially zero drift field with the dielectric and metal film lying atop the layer 12 with the bias being connected between the metal ring 22 and layer 11.

It will also be understood that the path of holes injected from layer 14 can also be temperature controlled by means of a suitable magnetic field which changes responsive to temperature.

Although this invention has been described with respect to its preferred embodiments, it should be understood that many variations and modifications will now be obvious to those skilled in the art, and it is preferred therefore that the scope of the invention be limited not by the specific disclosure herein but only by the appended claim.

The embodiments of the invention in which an exclusive privilege or property is claimed are defined as follows:

A semiconductor device comprising a wafer of semiconductor material having a first, second, third and fourth conductivity layers of alternate N and P conductivity types defining first, second and third junctions; a cathode electrode connected to said first layer and insulated from said second, third and fourth layers; a gate electrode connected to said second layer and insulated from said first, third and fourth layers; a dielectric layer connected to a portion of said third layer and an anode electrode connected to said fourth layer and insulated from said first, second and third layers; said dielectric layer having a conductive layer thereon; and circuit means including a voltage source and a temperature sensitive impedance in series therewith; said circuit means being connected across said conductive layer and said anode electrode.

References Cited by the Examiner

UNITED STATES PATENTS

| | | | |
|---|---|---|---|
| 3,051,847 | 8/1962 | Niemeyer | 307—88.5 |
| 3,079,484 | 2/1963 | Shockley et al. | 219—20 |
| 3,096,442 | 7/1963 | Stewart | 250—211 |

JOHN W. HUCKERT, *Primary Examiner.*

R. SANDLER, *Assistant Examiner.*